March 17, 1931.  E. J. STROHL ET AL  1,797,161
BATTERY OF DRY CELLS AND PROCESS OF ASSEMBLING THE LIKE
Filed June 6, 1927
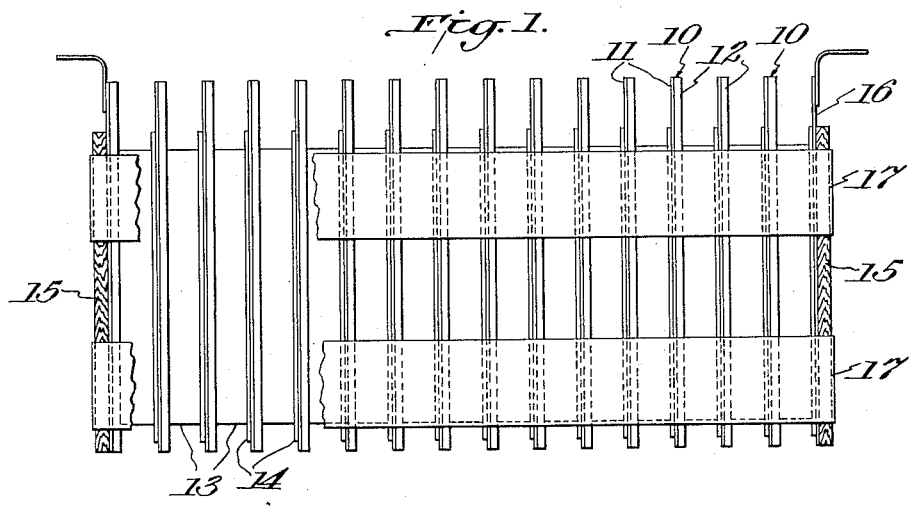
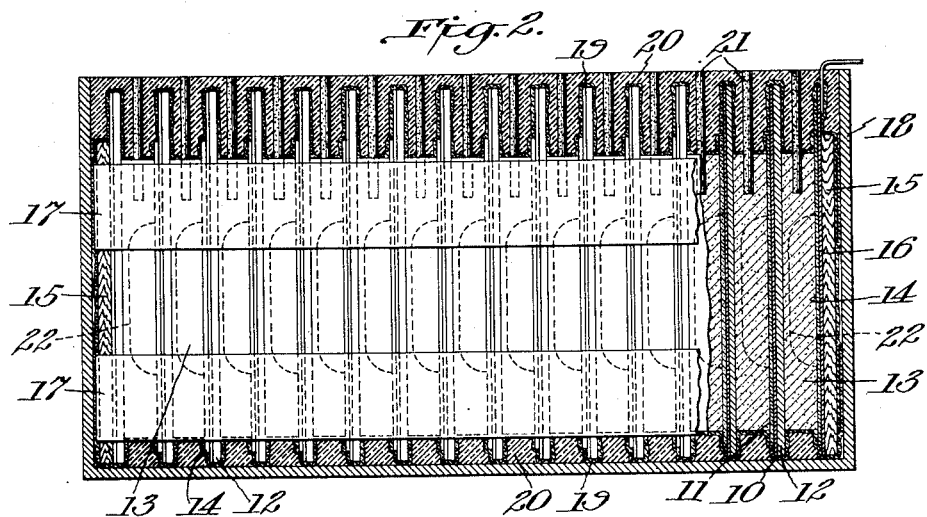

Patented Mar. 17, 1931

1,797,161

UNITED STATES PATENT OFFICE

ELMER J. STROHL, OF FREMONT, AND EDWARD C. SMITH, OF LAKEWOOD, OHIO, ASSIGNORS TO NATIONAL CARBON CO., INC., A CORPORATION OF NEW YORK

BATTERY OF DRY CELLS AND PROCESS OF ASSEMBLING THE SAME

Application filed June 6, 1927. Serial No. 196,907.

This invention relates to the manufacture of batteries of dry cells of the flat type, and in particular to batteries of such cells for use in radio communication and for similar purposes.

Batteries of the type employing flat duplex electrodes, i. e., electrodes comprising plates or strips of zinc or other suitable metal coated on one side with a plastic electrolyte-resistant material possessing electrically conductive properties and in which each of the electrodes serves in the battery assembly as the positive electrode of one cell and the negative electrode of the next succeeding cell, due to their greater compactness are characterized by greater current output per unit of volume than are similar batteries built up of a plurality of cylindrical dry cells. A battery of this type is disclosed in U. S. patent to Rider and Huntley No. 1,508,987.

The invention has for an object an improved method of assembling multi-cell batteries of the type above mentioned.

Another object of the invention is to improve the adherence of the sealing plastic to the portions of the battery assembly with which it comes into contact, and to thereby insure more perfect sealing of the battery against undesired communication between the respective cells or between the cells and the atmosphere.

Still another object of the invention is to prevent harmful heating of the battery during the pouring of the sealing plastic.

A further object is to produce a battery assembly which can be subjected to handling as a unitary structure before pouring of the sealing plastic. Another object is to eliminate the necessity for using a container constructed of such heavy material as would be required if the respective cell units were assembled directly within the container and then brought into compressed relation by the use of wedges or similar means, such as have heretofore been employed.

Other objects and advantages of the present invention will appear from the appended description and drawing.

According to the present invention, duplex electrode elements, depolarizing mix cakes and bibulous spacing sheets are built up into a pile or stack with the respective elements in the relative positions occupied in the completed battery. Endwise pressure is then applied to the stack to compress the assembly and while held under compression a wrapping of gummed paper tape or similar strip insulating material is applied so as to retain the cell elements under compression in a unitary assembly.

The taped assembly now may be placed in a cardboard carton or similar container and sealed by pouring a suitable insulating plastic into the space about and over the assembly. Preferably, however, and this is one feature of the present invention, the assembly is given a preliminary thin coating of plastic before it is placed in the container. This coating may be applied in any suitable manner such as by dipping or spraying, although for convenience dipping is preferred. This preliminary coating serves to insure against the crumbling off of portions of the mix cakes during handling of the assembly prior to the final pouring operation. The thin preliminary coating is applied at a high enough temperature so that it thoroughly wets and adheres to all exposed parts of the elements, thus forming a surface to which subsequently applied plastic material will readily and thoroughly attach even if applied at a lower temperature. Therefore, by applying a preliminary coating of plastic, it is possible to conduct the final pouring operation at a lower temperature thereby reducing the possibility of injury to the battery because of the heat given off from the cooling plastic. By preliminarily dipping the assembly the dissipation of the heat contained in the sealing plastic is also brought about in two stages and this of course, aside from any differential in the temperature at which the preliminary coating is applied and the final pouring is conducted, insures better control of the temperature of the battery assembly during these operations.

In the drawing, Fig. 1 is a side elevation of the taped assembly before dipping, with a portion of the binding tape shown as broken away.

Fig. 2 is a vertical section through a completed battery embodying the features of the present invention.

Referring to the drawing, 10 are the duplex electrodes each comprising a zinc plate 11 and a carbonaceous coating 12. In the inter-electrode spaces and centered with respect to the electrodes are depolarizing mix cakes 13 and bibulous paper spacers 14. In assembling the battery an end board 15 of wood or similar stiff insulating material is placed upon a support and the assembly is built up thereon by applying in succession a duplex electrode, a mix cake, a bibulous spacer, and then another duplex electrode and so on until a battery of the desired number of cell units is produced. The last electrode is shown as a plain zinc plate 16. Finally a second end board 15 is placed on the stack. The assembly is then subjected to endwise compression in a suitable manner so as not to interfere with the winding of tape around the assembly. A strip of gummed paper tape 17 is then wrapped one or more times around the assemby so as to retain the elements in close contact with one another under pressure. Preferably two bands of relatively narrow tape are employed so as to facilitate the holding of the assembly under compression during the taping operation.

The taped assembly is next dipped in a bath of molten insulating plastic. A mixture which has been very satisfactory for this purpose consists of 50% scale wax, 35% rosin and 15% blown petroleum asphalt. This mixture has a low fusing point and a low viscosity in the fused state thereby insuring that the molten plastic will penetrate all crevices and wet and adhere to all exposed portions of the battery which is dipped therein. Other plastic compositions which have a relatively low fusing point and low viscosity in the fused state may be used.

The dipped assembly, after the molten plastic adhering thereto has had time to solidify, is placed in a cardboard or stiff paper container 18 and molten plastic is then poured into the container to completely fill all the interstices between the container walls and the assembly. The filling plastic is preferably of such composition that it possesses free flowing properties at a temperature low enough to prevent harmful "cooking" of the battery before the plastic has cooled. A satisfactory composition consists of 20% scale wax and 80% of blown petroleum or natural asphalt. This composition should be fusible at about 150° C. and be sufficiently thin to pour readily at from 190–210° C. When cold this composition gives a firm, smooth elastic material. This composition has a somewhat higher fusing point than the dip composition above described and this promotes welding of the poured plastic to the dip coating.

Very good results are obtainable by using a composition such as that last above described not only for the pouring plastic but also for the preliminary dip and it is to be understood that the invention is not limited to the maintenance of a differential in the fusing points of the plastic compositions used in the dip and in the pouring. Dissipation of the heat contained in the molten plastic is facilitated by the application of the plastic in a plurality of layers or coatings, and this is true regardless of whether the same or a different composition is used in each coating.

In Figure 2 of the drawing the dip coating is shown at 19 as surrounding the assembly. The poured plastic is shown at 20. Porous inserts 21 are shown as passing through the sealing plastic and as embedded at one end in the mix cakes. This serves to insure adequate venting of the battery to prevent the creation of disruptive pressures due to the generation of gases during the operation of the battery. This feature is described in more detail in the copending application of Paul M. Buhrer, Ser. No. 167,254, filed February 10, 1927. While the present invention is not limited to this particular type of construction, it is to be noted that in Figure 2 air spaces 22 are shown in dotted line as formed in the mix cakes at points remote from the peripheral edge portions. These spaces preferably take the form of a plurality of narrow groove-like depressions in that face of the mix cake which abuts against the bibulous spacer 14. This feature is the subject of a copending application Ser. No. 160,961, filed by Clarence H. Dittrick and Newcomb K. Chaney on January 13, 1927.

It will be understood that the usual electrolyte salts and sufficient moisture to activate the battery are incorporated in the mix and in the bibulous spacers before they are assembled in the battery.

Various changes may be made in the details of construction or the method of assembly without departing from the scope of the invention as indicated in the appended claims.

We claim:

1. A battery assembly comprising a plurality of cells having flat electrode elements arranged in spaced relation, depolarizer mix in the spaces between said elements and binding tape surrounding said assembly and holding the same under compression.

2. A battery assembly comprising a plurality of cells having flat electrode elements arranged in spaced relation, depolarizer mix in the spaces between said elements, tension binding means holding the said elements and mix in a unitary assembly, and a thin layer of insulating plastic substantially uniformly distributed over the surface of the assembly.

3. A battery comprising a plurality of flat electrode elements arranged in spaced relation, depolarizer mix in the spaces between said elements, tension binding means holding the said elements and mix in a unitary assembly, a thin layer of insulating plastic applied directly on and substantially uniformly distributed over the surface of the assembly, a container enclosing said assembly, and a sealing plastic surrounding said assembly and filling the interstices between said container and said assembly.

4. A battery comprising a container, a unitary assembly of flat dry cells in said container, a tension binding tape therearound, a layer of insulating plastic surrounding said assembly, and a second layer of insulating plastic surrounding said assembly and filling the interstices between said assembly and said container.

5. A battery comprising a container, a unitary assembly of flat dry cells in said container, a tension binding tape therearound, a layer of fused insulating plastic surrounding said assembly, and a second layer of fused insulating plastic surrounding said assembly and filling the interstices between said assembly and said container, said second layer of insulating plastic fusing at a higher temperature than the first-mentioned layer.

6. Method of assembling a battery of flat dry cells, comprising forming a stack having flat electrode elements, depolarizer mix cakes and spacers interleaved as in the finished battery, applying pressure to the stack, and then wrapping said stack with tape to hold the said electrode elements, mix cakes and spacers in a unitary assembly.

7. Method of producing a unitary assembly of flat dry cells, comprising forming a stack having flat electrode elements, depolarizer mix cakes and spacers interleaved as in the finished battery, applying pressure to the stack, then wrapping said stack with tape to hold the said electrode elements, mix cakes and spacers in a unitary assembly, and finally dipping the assembly in a bath of molten plastic.

8. Method of assembling a battery of flat dry cells, comprising forming a unitary assembly of the desired number of cells, binding them together under appropriate tension, forming a thin coating of insulating plastic on said assembly, placing said assembly in a container, and pouring an insulating plastic into the container to fill the interstices between said assembly and said container.

9. Method of assembling a battery of flat dry cells, comprising forming a unitary assembly of the desired number of cells, dipping the assembly into a bath of insulating plastic, placing said assembly in a container and pouring an insulating plastic into the container to fill the interstices between said assembly and said container, the poured plastic being applied at a lower temperature than the dip coating.

In testimony whereof, I affix my signature.
ELMER J. STROHL.
In testimony whereof, I affix my signature.
EDWARD C. SMITH.